United States Patent Office 3,766,145
Patented Oct. 16, 1973

3,766,145
PREPARATION OF UNSATURATED POLYESTERS OF ISOPHTHALIC ACID
Robert M. Thompson, Chalfonte, Wilmington, Del., assignor to Sun Research and Development Co., Philadelphia, Pa.
No Drawing. Filed Aug. 6, 1971, Ser. No. 169,872
Int. Cl. C08g 17/00
U.S. Cl. 260—75 EP   10 Claims

ABSTRACT OF THE DISCLOSURE

Polyanhydride of isophthalic acid and either fumaric acid or maleic acid is prepared chemically or thermally. This polyanhydride is reacted with an ethylene epoxide or propylene epoxide to produce a polyester having ethylenically unsaturated double bonds useful as cross-linking sites.

BACKGROUND OF THE INVENTION

In the past polyesters of mixed aromatic dicarboxylic acids and unsaturated acids have been prepared by making a bis(hydroxyalkyleneoxycarbonyl)benzene which is then further reacted with substantially an equimolar amount of an unsaturated dicarboxylic acid such as maleic acid or fumaric acid or the anhydrides thereof. This process involves relatively long reaction times and requires the removal by distillation of by-product water and excess glycol from the product unsaturated polyester. This latter step does not make the process amenable to a continuous operation.

SUMMARY OF THE INVENTION

The present invention relates to a process scheme which eliminates the need to remove by-product water from the final unsaturated polyester thereby providing a process amenable to continuous operation. The process of the present invention is also more rapidly carried out than the prior art process.

In accordance with the present invention isophthalic acid or anhydride is mixed in from 0.5 to 1.5 molar proportions with one molar portion of fumaric acid or anhydride. The mixture of acids is then dehydrated thermally as by heating to from 250 to 300° C. for 8 to 15 hours or chemically. When done chemically a dehydrating agent such as a slight molar excess of acetic anhydride or polyphosphoric acid as based on the acid portion of the materials forming the anhydride polymer is used and a temperature of from 100 to 300° C. for from 6 to 15 hours is used. While any combination of isophthalic acid or isophthalic anhydride, along with any one of maleic acid, maleic anhydride, fumaric acid or fumaric anhydride may be used the combination of isophthalic acid and fumaric anhydride is preferred. The reaction forming this polyanhydride is:

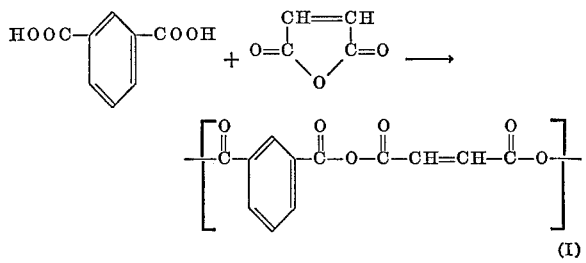

(I)

The polyanhydride (I) need not have a particularly high molecular weight. The pressure used in forming the polyanhydride is not critical and generally atmospheric pressure is used. In the thermal dehydration step the lower the pressure the more readily the water is removed from the polyanhydride. Therefore a reduced pressure is often desirable with from 50 mm. Hg abs. up to atmospheric pressure being generally used. If maleic acid or maleic anhydride is used isomerization of the maleic to the more stable fumaric linkage generally occurs during polyanhydride formation due to the high acid concentration. The polyanhydride may be obtained in pure form after chemical conversion by distilling to remove either acetic or polyphosphoric acid.

The polyanhydride is then reacted with propylene epoxide or ethylene epoxide. The reaction with propylene epoxide is as follows:

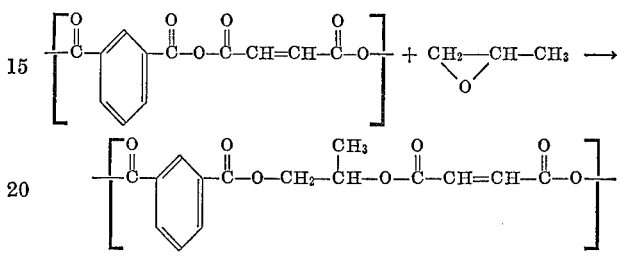

The two acids may either be in blocks or randomly alternating. In either case there will be at least two repeating units as shown for the polyanhydride above. The methyl group from the propylene epoxide may be adjacent either ester linkage. Generally this reaction is carried out at from 30 to 150° C. under a pressure of from 5 to 100 p.s.i.a. although much higher pressures such as 500 p.s.i.a. can be used if desired. Generally there should be a slight molar excess of the ethylene epoxide or propylene epoxide of from 5 to 10% as based on the number of anhydride units present. Preferably the polyesterification reaction is carried out in the presence of a catalyst. The preferred catalysts are the tertiary amines. Generally the suitable amines have the structure

wherein R, $R_1$ and $R_2$ are alkyl groups of from 1 to 4 carbon atoms. Tetra lower alkylammonium compounds such as tetramethylammonium bromide, i.e.

$(CH_3)_4N^+Br^-$ and lithium halides, i.e., LiCl, LiBr, also make good catalysts. Initiators are generally added to this epoxide-anhydride polymerization, i.e., hydroxy-containing compounds containing up to 5 carbon atoms such as propylene glycol or water. This may not be required using the polyanhydride, particularly if the acid ends are in sufficient concentration. The catalyst is used in an amount of from 0.001 to 0.1 weight percent as based on the polyanhydride. The polymer is a viscous liquid which becomes brittle at ice temperatures. Molecular weight of the polyester will range from 1500 to 3000. The polymer is generally thinned with styrene, ~30%, which gives a Gardner-Holt viscosity ranging from X to Z-6. The catalyst can either be left in the polymer or separated by evaporation.

After the polyesterification reaction the product polyester is diluted with from 20 to 40% as based on the polyester of a vinyl monomer generally styrene or styrene containing up to 5% α-methylstyrene although the acrylates or methacrylates are also suitable. A suitable inhibitor such as hydroquinone is preferably added along with or just prior to the addition of the vinyl monomer. The inhibitor is employed in customary quantities of from 0.005 to 0.2 weight percent based on the total weight of vinyl monomer plus polyester. The vinyl monomer is employed in conventional amounts of from about 20 to 40 weight percent vinyl monomer as based on the polyester plus vinyl monomer. The vinyl monomer modified polyester can be cured by the usual procedures. For example a peroxide can be added to promote the reaction between the vinyl monomer and the ethylenically unsaturated bonds of the polyester. An accelerator can also be employed if desired. Examples of useful peroxides include benzoyl peroxide, t-butyl hydroperoxide, methylethyl ketone hydroperoxide and the like. Useful accelerators include cobalt naphthenate and diethyl aniline.

The vinyl monomer modified polyesters of the invention are useful in the production of laminates, molded articles, cast articles, etc. The composition is particularly useful as a glass-fiber reinforced casting composition wherein from 10 to 50% of glass fibers as based on the overall composition are used.

In a glass reaction vessel equipped for distillation are charged 100 g. of isophthalic acid, 70 g. of fumaric acid and 1600 ml. of acetic anhydride. The mixture is refluxed while acetic acid and acetic anhydride are slowly removed. After 4 hours the acetic acid ceases to distill. Most of the remaining acetic anhydride is removed rapidly until the residue contains the mixed anhydrides with 50 weight percent acetic anhydride. This mixture is heated in a glass tube until the acetic anhydride is removed. The residue is then heated to 230° C. at 1 mm. Hg abs. for 1.5 hours. The temperature is then increased to 280° C. for 30 minutes. When the heat is removed, the polymer sets up as an amorphous solid.

Sixty-nine grams of the resulting polyanhydride are charged to a 300 ml. stirred autoclave with 0.01 g. of triethylamine and 1.2 ml. of propylene glycol. After purging the system of air with nitrogen, propylene oxide is added to the reactor, initially at 10 p.s.i.a. and 60° C., and then increased to such a rate as to maintain a temperature of 80 to 90° C. and 30 p.s.i.a. On completion of the addition which requires 19 ml. of propylene epoxide, the pressure drops off rapidly, after which 0.12 g. of hydroquinone is added to the viscous product. The mixture is then heated to 180° C. It is then pumped into preheated styrene (60° C.) with stirring. The addition of the unsaturated polyester is carried out at such a rate to maintain a solution temperature of 82° C.

A portion of the resulting mixture, 64 g. is blended with 16 g. of one-quarter inch chopped glass fibers to produce a casting composition. A 0.6 g. portion of benzoyl peroxide is stirred into the casting composition and the resulting mixture is poured into a rectangular mold, 4" x 6", and allowed to cure 16 hours at 135° F., 2 hours at 180° F. and 2 hours at 220° F. The resulting cast sheet is one-quarter inch thick and has a good appearance and excellent physical properties.

The invention claimed is:

1. A process of producing a polyester comprising reacting isophthalic acid in from 0.5 to 1.5 molar proportion with fumaric anhydride or maleic anhydride at a temperature of from 100° C. to 300° C. for from 6 to 15 hours, to form a polyanhydride containing repeating units of the structure

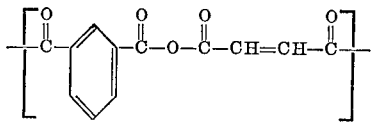

polyesterifying said polyanhydride with propylene epoxide or ethylene epoxide at from 30 to 150° C. using a molar excess of from 5% to 10% of the ethylene epoxide or propylene epoxide as based on the number of anhydride units present in the presence of a catalytic amount of a polyesterification catalyst selected from hte class consisting of

wherein R, $R_1$ and $R_2$ are alkyl groups of from 1 to 4 carbon atoms, tetra lower alkyl ammonium compounds, lithium chloride and lithium bromide and a minor amount of a polyesterification initiator which is a hydroxy-containing compound containing up to 5 carbon atoms to form a polyester.

2. The process of claim 1 wherein the initiator is a glycol containing up to 5 carbon atoms.

3. The process of claim 2 wherein the polyesterification catalyst is

4. The process of claim 2 wherein the polyesterification catalyst is tetramethylammonium bromide.

5. The process of claim 2 wherein the polyesterification catalyst is lithium chloride.

6. The process of claim 2 wherein the polyesterification catalyst is lithium bromide.

7. The process of claim 3 wherein the polyesterification initiator is propylene glycol.

8. The process of claim 3 wherein the dehydrating agent used in forming the polyanhydride is acetic acid or phosphoric acid.

9. The process of claim 3 wherein the polyester is blended with from 20 to 40 weight percent as based on the polyester of styrene or styrene containing up to about 5 weight percent α-methylstyrene and cured.

10. The process of claim 7 wherein the polyester is blended with from 20 to 40 weight percent as based on the polyester of styrene or styrene containing up to about 5 weight percent α-methylstyrene and cured.

References Cited

UNITED STATES PATENTS

| | | | |
|---|---|---|---|
| 3,296,219 | 1/1967 | Jacoby et al. | 260—78.4 R |
| 1,845,198 | 2/1932 | Schmidt | 260—75 EP |
| 3,227,665 | 1/1966 | Fourcode et al. | 260—40 R X |
| 2,966,479 | 12/1960 | Fischer | 260—78.4 EP |
| 3,370,043 | 2/1968 | Milligon | 260—75 EP |

OTHER REFERENCES

Lee et al.: Handbook of Epoxy Resins, McGraw-Hill (1967), pp 12–3.

MORRIS LIEBMAN, Primary Examiner

S. M. PERSON, Assistant Examiner

U.S. Cl. X.R.

260—40 R, 78.4 E, 78.4 EP, 861